United States Patent [19]
Young

[11] 4,379,359
[45] Apr. 12, 1983

[54] POSITIVE LOCK HOSE CLAMP

[76] Inventor: Donald L. Young, 2805 Hill Valley Dr., Escondido, Calif. 92025

[21] Appl. No.: 230,454

[22] Filed: Feb. 2, 1981

[51] Int. Cl.³ ............................................. B65D 63/10
[52] U.S. Cl. .................................... 24/273; 24/71 ST; 98/39
[58] Field of Search .............. 24/19, 24, 68 T, 71 CT, 24/71 R, 71 ST, 71 SK, 71 TD, 71 T, 221 R, 212, 211 P, 191, 193, 270, 273, 327, 328, ; 98/50, DIG. 7

[56] References Cited

U.S. PATENT DOCUMENTS

| 270,922 | 1/1883 | Aldrich | 24/273 |
| 2,931,471 | 4/1960 | Howard, Jr. | 24/221 R X |
| 3,797,077 | 3/1974 | Omori et al. | 24/273 |
| 3,859,816 | 1/1975 | McDonald et al. | 98/50 |

FOREIGN PATENT DOCUMENTS 503779  6/1951  Belgium ................................ 24/273

Primary Examiner—Albert J. Makay
Assistant Examiner—Harold Joyce
Attorney, Agent, or Firm—Brown & Martin

[57] ABSTRACT

A toggle clamp assembly for a flexible hose includes a flexible strap having a friction grip buckle for securing the ends of the strap into a loop around a hose and a toggle lever having one end attached to the strap and adapted to pivot from a non-tensioning position to a tensioning position for applying tension to the strap for clamping it about a flexible hose. The toggle lever includes a slot for receiving a twist fastener for fastening or holding the lever in the tensioning position.

3 Claims, 4 Drawing Figures

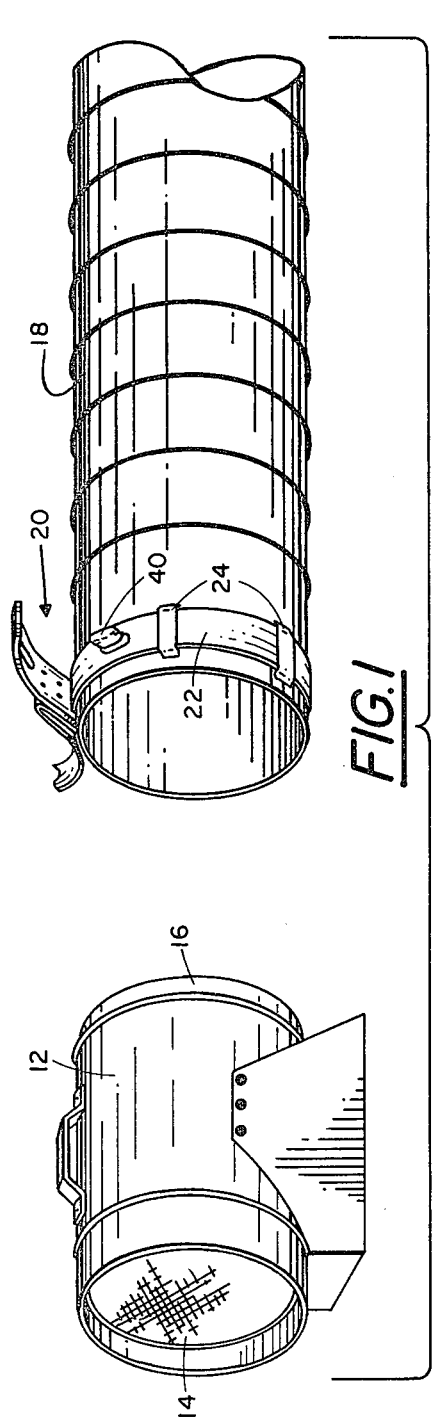
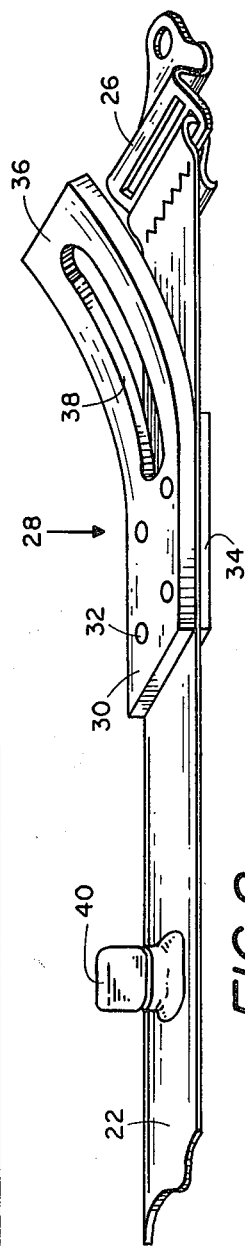
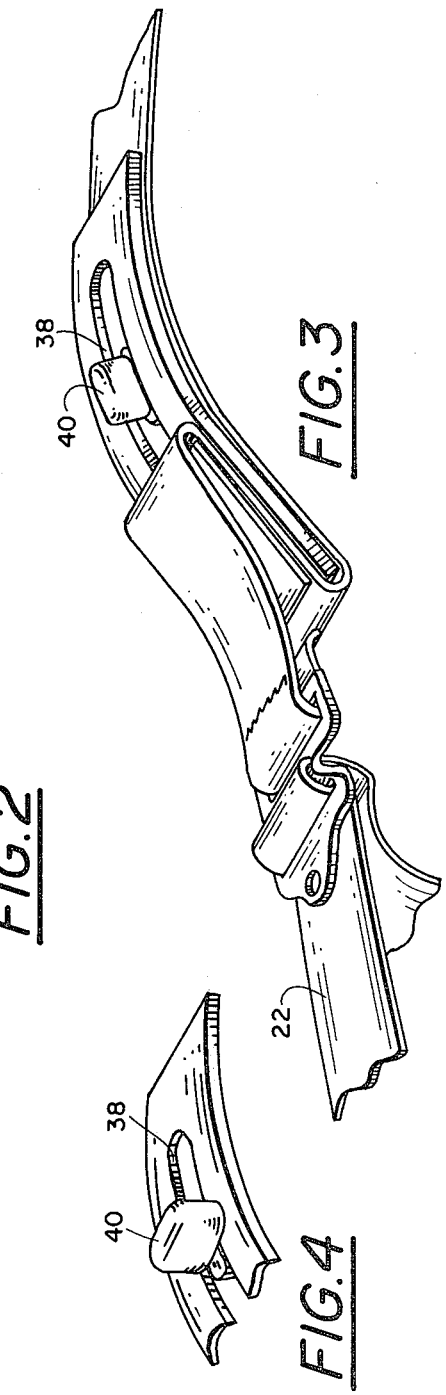
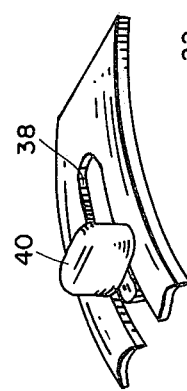

POSITIVE LOCK HOSE CLAMP

BACKGROUND OF THE INVENTION

The present invention relates generally to clamps and pertains particularly to a toggle clamp for hoses.

Many utility lines such as power and telephone lines are placed in tunnels underneath streets and the like in cities. Access is provided through manholes to the tunnels to permit access thereto for repair and maintenance of the utility lines. Fresh air must be supplied to the tunnels to permit workmen to work therein.

Air is typically supplied to such tunnels by large blowers which are connected to flexible hoses or tubes for supplying air to such tunnels. The flexible hoses are typically constructed of a fabric material and have one end releasably connected to the outlet of an air blower with the other end disposed in the tunnel. Conventional clamps for clamping the end of the hose to the blower outlet have proved unsatisfactory in that they occasionally fail and permit the end of the hose to slip from the blower housing. This interrupts the supply of air to the tunnel and can be potentially hazardous to occupants in the tunnel.

It is therefore desirable that an effective clamp be available for quickly and effectively clamping the flexible hose to the blower housing.

SUMMARY AND OBJECTS OF THE INVENTION

It is therefore the primary object of the present invention to provide an improved quick release clamp.

In accordance with the primary aspect of the present invention a hose clamp comprises a flexible strap having a buckle at one end for receiving the other end of the strap for providing an adjustable loop and toggle lever secured to the strap for drawing tension in the strap and including hold down means for securing the handle in the tensioned position.

BRIEF DESCRIPTION OF THE DRAWING

The above and other objects and advantages of the present invention will become apparent from the following description when read in conjunction with the drawings wherein:

FIG. 1 is a perspective view of the clamp assembly shown in use on a flexible hose and blower.

FIG. 2 is an enlarged perspective view showing the details of the present invention.

FIG. 3 is a side elevation view showing the threading of the clamping strap through the buckle, and toggle lever in the tensioned position.

DETAILED DESCRIPTION OF A PREFERRED EMBODIMENT

Turning to FIG. 1 of the drawing a blower for supplying a continuous flow of air is designated generally by the numeral 10 and comprises a housing 12 having an inlet 14 and an outlet 16. An elongated flexible hose 18 is adapted to be detachably connected to the outlet end 16 and secured in position by means of a clamp designated generally by the numeral 20 in accordance with the present invention. The blower is adapted to rest on a suitable support surface such as a street at a manhole and the air hose 18 is connected to the outlet and extended into the manhole into the underground tunnel for supplying fresh air to workmen in the tunnel. The hose can be as typically of a diameter anywhere from 8 inches to 2 feet in diameter and is constructed of a flexible material such as a woven fabric of canvas nylon or the like. The hose may include supporting spiral wire ribs for supporting the hose in the open or uncollapsed position.

The clamp assembly includes an elongated, flexible woven strap member 22 which may be made of a nylon web or the like and extends through a plurality of loops 24 extending about the end of the hose 18. These loops hold the clamp in position at the end of the hose. The hose is placed over the end of the outlet portion 16 of the blower and is clamped into position by the clamp 20. The outlet is typically of a circular or cylindrical configuration as illustrated and is adapted to receive a hose which is of slightly larger diameter than the outer surface of the outlet conduit.

As best seen in FIG. 2, the clamp assembly includes the elongated strap 22 having a buckle 26 at one end of a friction gripping type. The buckle is secured in the usual manner such as by looping one end of the strap through an opening and sewing the end or the like in position. This arrangement permits easy selectable adjustment of the size of the loop formed by the clamp assembly. A toggle lever 28 includes a fixed end 30 secured at spaced positions therealong to the strap 22 by a plurality of rivets or the like 32 and a backing plate 34 disposed on the opposite side of the strap 32 from the toggle lever 28. A free end 36 of the toggle lever extends toward the buckle 26 and is preferably curved upward to conform to substantially the outer contour of the flexible hose 18.

The lever 28 has a free end 36 and a fixed end 30 of substantially the same length and positioned adjacent the buckle end of the strap 22 in a position such that the free end of the lever extends about or approximately to the buckle. This leaves the remaining portion of the strap beyond the fastener for the lever 36 free for adjustment of the loop about a flexible hose. The free end 36 of the lever 28 includes an elongated slot 38 for cooperatively receiving a twist fastener 40 which is positioned at the appropriate distance from the fixed end 30 of the toggle lever for cooperatively engaging the slot 38 of the lever. The twist fastener has a generally oblong configuration and includes a rotatable top that rotates relative to the body thereof for extending crossways of the slot 38 for engaging and holding the lever in position as will be explained.

As will be appreciated the toggle lever 28 is secured to the outside of the strap 22 such that the toggle lever is on the exterior thereof for tensioning the strap about the flexible hose. The upward curved end 36 spaces the lever away from the strap for ease of grasp preparatory to tensioning the clamp. This curve also conforms to the outer surface of the hose when clamped in the tension position.

Turning to FIG. 3, in use of the toggle clamp strap assembly the strap 22 is looped about a flexible hose with the free end of the strap inserted through the inner slot of buckle 26 over the top and down through the outer slot to extend back along the outside of the portion of the strap that engages the hose as shown. When the strap 22 is thus pulled taught, the buckle 26 is pulled downward by the strap into frictional engagement with the strap and thus secures it in position by frictional engagement. This provides a ready adjustable length of the strap and an adjustable loop thereof.

The strap assembly is looped about a flexible hose with the toggle lever in the release position as shown in FIG. 2. Once the strap is appropriately secured about a flexible hose, the free end of the toggle lever is grasped and pulled away from the buckle end of the strap (FIG. 3) and pivoted about the fixed end 30 thereof, effectively shortening the length of the strap 22 and tensioning it about the outer surface or diameter of the flexible hose 18 clamping it into tightning engagement with the outer surface of the outlet 16 of the blower. The toggle lever is pivoted down to a position as in FIG. 3 for receiving the twist fastener as shown in FIG. 4 such that the fastener extends through the opening or slot 38 and is then twisted about its axis as shown in FIG. 4 to secuure and hold the free end 36 of the toggle lever 28 down in the tensioned position. This provides a quick release and clamping feature such that the hose 18 can be quickly slipped over the end 16 of the blower housing and the toggle lever 28 quickly pulled down into the tension position and secured thus quickly clamping the flexible hose to the blower. In a similar manner, the hose can be quickly released from the blower housing for takedown or breakdown of the blower assembly. The strap 22 being of a fabric material is highly flexible and has some stretch under tension to easily conform to the blower outlet and maintain tension on the hose.

This provides a quick release assembly that is capable of quickly and effectively tightly securing the flexible hose to the housing to prevent accidental removal thereof during use.

Thus, while I have illustrated and described my invention by means of specific embodiments, it is to be understood that numerous changes and modifications may be made therein without departing from the spirit and scope of the invention as defined in the appended claims.

I now claim:

1. A hose clamping strap for clamping a flexible hose to a cylindrical air supply conduit, comprising:
   an elongated flexible woven fabric strap having a first end and a second end,
   a friction buckle secured to said first end of said strap and adapted to receive said second end for establishing a loop of a selective size,
   a toggle lever having a fixed end fixed to said strap at spaced points along said strap adjacent said first end, and a curved free end normally extending along said strap in a direction toward and substantially to said buckle and pivotal to extend in a second direction for removing slack from said strap and clamping said strap against a flexible hose, and
   fastening means comprising a slot in the free end of said toggle lever, and a releasable twist fastener secured to said strap for extending through said slot and rotating to a securing position for releasably securing said free end of said toggle lever to said strap in a position extending in said second direction opposite said first direction.

2. The clamping strap of claim 1 wherein said fixed end of said toggle lever is substantially the same length as said free end.

3. The clamping strap of claim 1 in combination with an air blower having a cylindrical outlet conduit, and a flexible air supply hose releasably secured to said conduit by said clamping strap.

* * * * *